(No Model.)

M. H. SNOW.
PLOW ATTACHMENT.

No. 444,715. Patented Jan. 13, 1891.

UNITED STATES PATENT OFFICE.

MASSENA H. SNOW, OF SUGAR GROVE, ILLINOIS.

PLOW ATTACHMENT.

SPECIFICATION forming part of Letters Patent No. 444,715, dated January 13, 1891.

Application filed January 12, 1889. Serial No. 296,177. (No model.)

*To all whom it may concern:*

Be it known that I, MASSENA H. SNOW, a citizen of the United States, residing at Sugar Grove, in the county of Cane and State of Illinois, have invented new and useful Improvements in Plow Attachments, of which the following is a specification.

In using plows with mold-boards made for the purpose of turning stubble and sod, called "half-and-half" plows, the furrow-slice, instead of being turned and inverted into the furrow made by the previous plowing, is liable to break and shoot out from the mold-board across the said furrow and leave the surface in ridges.

The object of my improvement is to avoid this difficulty by causing the furrow-slice to be held and guided against the mold-board so as to be inverted and rolled over with its grassy side under in the furrow previously made. This I do by means of a steel bar jointed to the plow-beam and extending backward about parallel with the face of the mold-board, so as to lie against the grassy side of the furrow-slice and hold it against the mold-board until it is in position to be turned over by the mold-board as the furrow-slice slides up thereon between it and the holding-bar, so that the action of the said bar is to hold and guide the furrow-slice from the time it is cut by the plow until it is inverted and placed in the furrow with a smooth lap.

Figure 1:
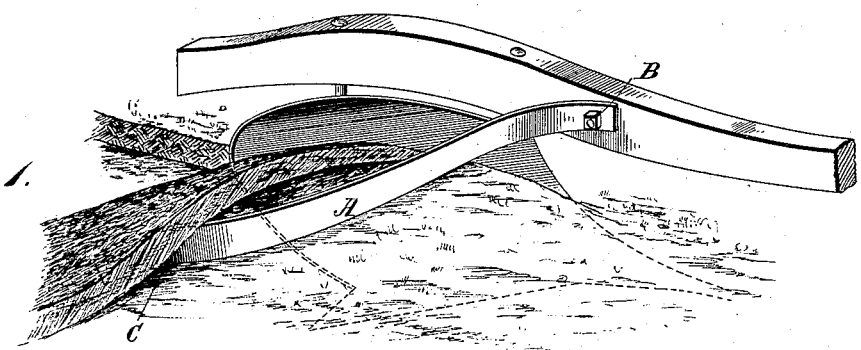
Figure 2:
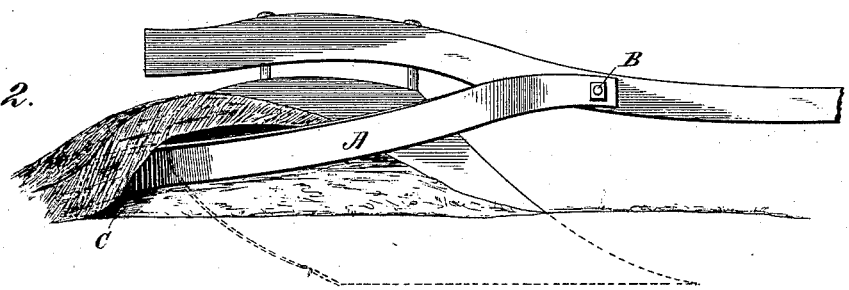
Figure 3:
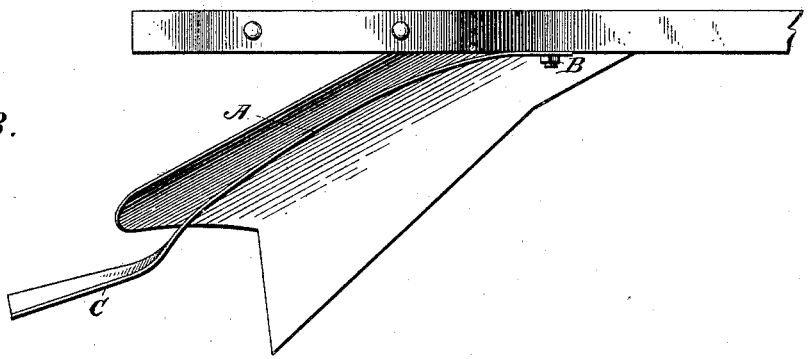

In the accompanying drawings, Figure 1 shows the plow with the attachment for holding and guiding the furrow-slice to prevent it from breaking and to invert it smoothly into the previous furrow, and Fig. 2 is a side view of the same. Fig. 3 is a top view of the same.

The holding and guiding bar A is secured to the plow-beam or other part of a plow by a pivoted connection B. From this pivot the bar A stands out substantially in the oblique line of the upper curved face portion of the mold-board and a sufficient distance from the latter to allow the furrow-slice to slide up between said bar and the mold-board, so as to support and guide the furrow-slice into position to cause it to be inverted into the furrow already made. While this guiding-bar extends substantially parallel with the face of the mold-board, it is also curved and extends a short distance at C to the rear of the mold-board the better to facilitate the guiding and inverting of the furrow-slice, and for this purpose the guide-plate may be set higher or lower in its relation to the surface of the mold-board, so as to give a long turn to the furrow-slice. The action of the curved bar is solely to hold the furrow-slice at its upper edge as it is being cut and to guide and turn it over and deliver it smoothly into the previously-plowed furrow.

Rods and bars having variously-curved forms and constructions have been applied to plow-beams so as to stand in front of the mold-board in position to press down and turn under the weeds and stubble by a drawing or by a pushing action in advance of the turning or inverting of the furrow-slice, and away from the surface of the mold-board; but the guide-bar as I have arranged and formed it serves to support and to guide the furrow-slice up against the mold-board, so as to cause the slice to have a long and full turning-over action and prevent its breaking off short at the end of the mold-board.

My improvement is designed for use with either walking or sulky plows.

I claim as my improvement—

The combination, with the mold-board, of the guide-bar fixed in front of the mold-board in substantially parallel relation to the curved face thereof, a short distance therefrom, and extending rearward from its connection with the plow, whereby to support the furrow-slice against the mold-board, to invert it and prevent its breaking off short, as described.

In testimony whereof I have hereunto set my hand in the presence of two subscribing witnesses.

MASSENA H. SNOW.

Witnesses:
JAMES D. FOX,
GARDNER S. ROBERTS.